United States Patent
Arlt et al.

(10) Patent No.: US 9,879,828 B2
(45) Date of Patent: Jan. 30, 2018

(54) ARRANGEMENT AND METHOD FOR OPERATING HYDROGEN FILLING STATIONS

(71) Applicant: HYDROGENIOUS TECHNOLOGIES GmbH, Erlangen (DE)

(72) Inventors: Wolfgang Arlt, Nürnberg (DE); Peter Wasserscheid, Erlangen (DE)

(73) Assignee: HYDROGENIOUS TECHNOLOGIES GmbH, Erlangen (DE)

(*) Notice: Subject to any disclaimer, the term of this patent is extended or adjusted under 35 U.S.C. 154(b) by 599 days.

(21) Appl. No.: 14/475,860

(22) Filed: Sep. 3, 2014

(65) Prior Publication Data

US 2016/0061383 A1    Mar. 3, 2016

(51) Int. Cl.
B65B 1/20 (2006.01)
F17C 11/00 (2006.01)

(52) U.S. Cl.
CPC ........... F17C 11/005 (2013.01); Y02E 60/321 (2013.01)

(58) Field of Classification Search
CPC ... Y02E 60/321; Y02E 60/324; Y02E 60/325; Y02E 60/327; Y02E 60/328; F17C 11/005
See application file for complete search history.

(56) References Cited

U.S. PATENT DOCUMENTS

2014/0110017 A1* 4/2014 Gupta ................ F17C 5/007
141/4

FOREIGN PATENT DOCUMENTS

| DE | 10 2008 034 221 A1 | 1/2010 |
| DE | 10 2010 038 491 A1 | 2/2012 |
| DE | 10 2011 111 565 A1 | 2/2013 |
| DE | 10 2012 221 809 A1 | 5/2014 |
| EP | 1 475 349 A2 | 11/2004 |
| EP | 1 878 714 A1 | 1/2008 |

OTHER PUBLICATIONS

Chemischer Wasserstoffspeicher; in: Wikipedia—Die freie Enzyklopädie; Version v. Feb. 25, 2012; DOI: https://de.wikipedia.org/w/index.php?title=Chemische_Wasserstoffspeicher&oldid=100102687.
Brennstoffzellenfahrzeug; in: Wikipedia—Die freie Enzyklopädie; Version v. Mar. 3, 2012; DOI: https://de.wikipedia.org/w/index.php?title=Brennstoffzellenfahrzeug&old id=100428242.
Teichmann et al., A future energy supply based on Liquid Organic Hydrogen Carriers (LOHC), Energy Environ. Sci, 2011, 4, 2767.
Annual program report 2005, DOE Hydrogen Program.
Annual progress report 2008, DOE Hydrogen Program.

* cited by examiner

*Primary Examiner* — Jason K Niesz
(74) *Attorney, Agent, or Firm* — McGlew and Tuttle, P.C.

(57) ABSTRACT

The present application relates to an arrangement for the advantageous construction of a hydrogen filling station.

In this case, a special chemical substance class, which is called a Liquid Organic Hydrogen Carrier (LOHC), is dehydrogenated and the hydrogen produced is pressed into the tank of a vehicle by compression. LOHCs have almost twice the quantity of hydrogen per liter compared with a 700 bar tank, but are, however, even stored at ambient temperature and ambient pressure.

15 Claims, 1 Drawing Sheet

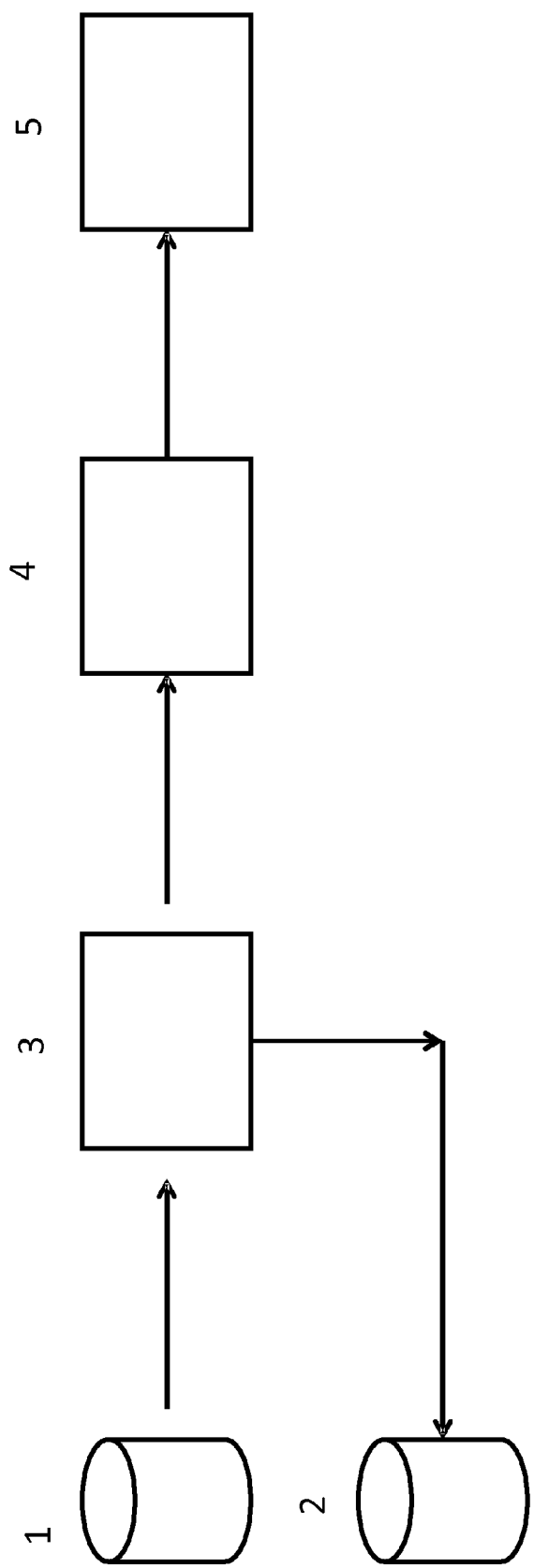

ARRANGEMENT AND METHOD FOR OPERATING HYDROGEN FILLING STATIONS

FIELD OF THE INVENTION

The present invention relates to an arrangement for storing hydrogen in filling stations for vehicles, e.g. passenger cars, buses, lorries, forklifts, ships, etc. and a method for the filling process.

BACKGROUND OF THE INVENTION

Hydrogen is regarded as a suitable energy carrier worldwide and several filling stations have already been set up in various countries of the world to operate vehicles. An essential and critical aspect in using hydrogen is
a) the warehousing or storage of hydrogen, which, as is known, is only possible at a low density,
b) the danger of explosion coming from pure hydrogen in a mixture with air,
c) the design for apparatus for high pressures and/or low temperatures that have to be used for storage, is most cost-intensive.

To date, a series of hydrogen storage methods have been investigated: adsorptive, absorptive, as a liquid, as a highly compressed gas. The disadvantage of all the methods is their low energy density per volume and the usually high costs of the carrier.

The previously established methods for storing hydrogen as a liquid and under pressure represent technical solutions, which were hitherto not to exist in large quantities of hydrogen in the publicly accessible area and certainly not in filling stations—in particular because of the high technical outlay, the relatively high costs connected therewith and the safety concerns. Thus, containers with compressed hydrogen are difficult to seal and hydrogen explodes or detonates with shock waves >1,000 m/s in almost every mixture of 4-75% with air. In addition, the minimum ignition energy is lower than in other gaseous materials. Hydrogen is classified as highly flammable (F+) and can ignite spontaneously at high exit speeds, as also in the case of other gases. The formula conversion when exploding with air is very high at 286 kJ/mol.

It is therefore desirable to provide a technology for storage at filling stations that avoids the risks of pure hydrogen.

Alternative storage forms for hydrogen are known. Various aromatic compounds, in particular condensed polycyclic hydrocarbons, which can be used as hydrogen stores, are described in EP 1475349 A1 and DE 10 2012 221 809 A1. The substances described are used in mobile as well as in stationary systems. A method and an arrangement for the energy supply of detached buildings is described in DE 10 2011 111 565A1.

SUMMARY OF THE INVENTION

The storage of hydrogen by means of LOHC (Liquid Organic Hydrogen Carriers) is to be described in this application. LOHC is taken to mean a group of chemical materials, such as are described in Energy Environ. Sci., 2011, 4, 2767. The functioning of an LOHC is described by:

The low-energy form of the LOHC is reversibly converted by means of hydrogenation by hydrogen into the energy-rich form, which, in a catalysed reverse reaction, recovers hydrogen from the hydrogenated product with the formation of the low-energy form merely by a temperature increase and/or reduction of the hydrogen pressure. The reaction is therefore reversible. Reversible means that the materials are guided from a low-energy site to an energy-rich site in a cycle and are not themselves consumed. They are only the transporter of energy, in this case hydrogen. Particularly advantageously usable LOHCs allow this reversible conversion under technically relevant conditions, pressure and temperature being mentioned by way of example, which are introduced in the technology. These are temperatures from ambient temperature up to 350° C. and pressures from vacuum up to 300 bar.

Reference is to be made here by way of example to the hydrogenation/dehydrogenation of N-ethylcarbazole (NEC). In this case, N-ethylcarbazole (NEC) as the low-energy form is converted to the perhydro form (H12-NEC) as the energy-rich form according to the following reaction plan.

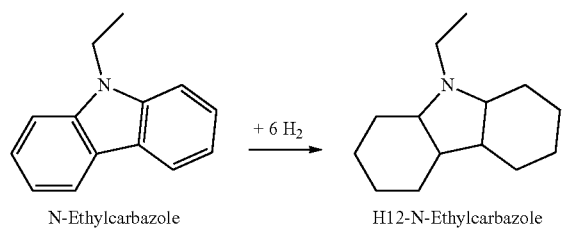

N-Ethylcarbazole          H12-N-Ethylcarbazole

H12-NEC is a liquid that can be stored at ambient temperature and ambient pressure. The storage density for hydrogen according to this reaction is approximately twice as high in terms of volume as in a 700 bar tank filled with hydrogen, the tank, in contrast to a pressure container, being able to adopt any form.

A second reference is made to polycyclic aromatic hydro carbons that are used today as industrial heat transfer liquids like Dibenzyltoluene, Benzyltoluene, e.g. known under the trademark Marlotherm® or their isomeric mixtures.

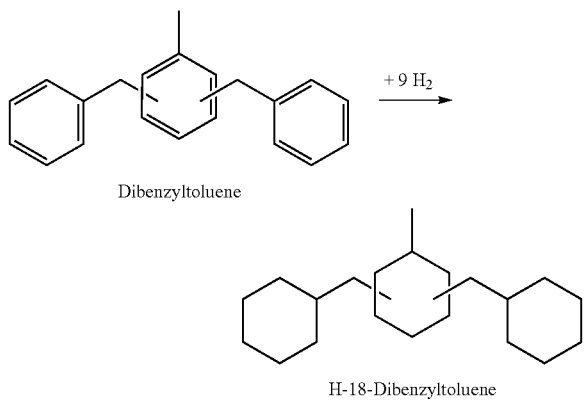

Dibenzyltoluene

H-18-Dibenzyltoluene

The method and the arrangement are aimed at the danger-free and technically simple supply to various kind of vehicles, like for example motor vehicles, buses, lorries, forklifts, ships, etc., collectively called the "vehicle" below, with pure hydrogen. There is therefore the advantage of not reequipping filling stations for operation at very low temperatures (liquid hydrogen) or very high pressures with high expenditure, but continuing to use the existing infrastructure and storing hydrogen in the form of LOHC without danger.

This objective is achieved according to the invention by an arrangement, in which the hydrogen is not stored as a pure material but chemically bound in an LOHC in the filling station, and a method comprising transferring the at least partially hydrogenated LOHC from the storage tank into at least one chemical reactor and dehydrogenating the at least partially hydrogenated LOHC in the chemical reactor while releasing hydrogen, condensing organic vapours by means of a dephlegmator and cooling the hot hydrogen to a temperature that is suitable for filling vehicles like passenger cars, buses, lorries, forklifts, ships, etc.

transferring the condensed vapours into tank, transferring the hydrogen by compression into the hydrogen infrastructure of vehicles like passenger cars, buses, lorries, forklifts, ships, etc.

transferring the low-energy LOHC into a second tank, and in which the LOHC can be unloaded in the reactor at temperatures from ambient temperature to 350° C., preferably 180 to 300° C. and pressures from vacuum to 30 bar, preferably vacuum to 10 bar, particularly preferably 0.5 to 5 bar. A suitable chemical catalyst can be used for the process.

Accordingly, the arrangement for filling vehicles by means of LOHC comprises the following elements:

at least two storage tanks, one for the energy-rich form of the LOHC, the other for the energy-lean form, at least one chemical reactor for the at least partial dehydrogenation of an at least partially hydrogenated LOHC while releasing hydrogen, and a compressor of gaseous hydrogen from a pressure close to atmospheric pressure up to the operating pressure of the hydrogen container of the vehicle.

The following functional elements for the energy supply of vehicles are therefore coupled or combined with one another:

danger-free storage of hydrogen in a chemical substance for an efficient, safe and economical storage of hydrogen with high storage density and without significant losses.

use of the existing tank infrastructure further use of the hydrogen infrastructure for the vehicles being filled.

A production of the hydrogenated, in other words, energy-rich form of the LOHC can take place at sites, at which energy is economically available. These may be wind farms or photovoltaic farms at home or abroad or areas with economical geothermal energy, as in Iceland, where hydrogen is produced from renewable energy. Alternatively, hydrogen can also be produced from conventional fossil sources like for example natural gas. The loaded i.e. hydrogenated LOHC can be transported economically like diesel within the same infrastructure as diesel. Even the combination of the hydrogen filling station with wind farms or photovoltaic farms located at the site of the filling station is possible in one variant of the invention, in which case no, or only little, transportation of the LOHC occurs. The heat occurring during the hydrogenation of the LOHC may, for example, be used to heat the filling station or nearby buildings and as a heat supplier for the dehydrogenation reaction, optionally using a heat pump. Alternatively the heat can be used for cooling via cryoadsorption or an absorption cold machine.

The advantage of the present arrangement and the method described below is that a filling station only requires an infrastructure which is similar to the one for diesel fuels. A further advantage is that the pure hydrogen, in contrast to previously known methods and models, does not have to be present in large quantities, but can be stored in a danger-free manner and for an unlimited time in a chemical substance, safely and without pressure in an existing infrastructure, such as, for example, in the tanks of a filling station.

In a preferred embodiment, which is shown in FIG. 1, the at least one tank 1 for the energy-rich form is connected to the at least one chemical reactor 3. The energy-lean form of the LOHC is stored in a second tank 2 and provided for transportation to the place of the hydrogenation either at another site or on-site. Complete recycling of the substances used thus takes place. As the used LOHC is not consumed, very long usage times or a large number of recycling cycles can be aimed for.

The hydrogen produced is compressed in the compressor 4 and fed to the storage device of the vehicle 5. The lines to transport hydrogen are preferably produced from gas-tight and pressure-resistant materials. As an option, a non-shown buffer element in form of a pressurized hydrogen storage container can be arranged between the compressor 4 and the vehicle 5. The pressurized hydrogen storage container enables buffering, in particular short-term buffering, of pressurized hydrogen, which is provided by the hydrogen filling station before filling into the vehicle 5. In one variant of the preferred embodiment, a dephlegmator is inserted after the release reactor 3, said dephlegmator cooling the hot hydrogen at about 200° C. to 300° C. to ambient temperature and simultaneously reducing the organic proportions caused by the vapour pressure of the energy-rich or energy-lean LOHC. The condensed proportions are stored in tank 2.

In a particularly preferred embodiment, Dibenzyltoluene, Benzyltoluene, isomeric mixtures of Dibenzyltoluene or Benzyltoluene, N-ethylcarbazole, N-n-propylcarbazole or N-iso-propylcarbazole is used as the LOHC suitable for the storage of hydrogen.

It is advantageous if the LOHC releases the hydrogen at temperatures of 50 to 350° C. and pressures of 0.1 to 5 bar using a precious metal catalyst.

The present arrangement allows the filling of vehicles using the above arrangement with the following steps:

providing a tank for the energy-rich form (1 in FIG. 1)

transferring the at least partially hydrogenated LOHC from the storage tank into the at least one chemical reactor 3 and dehydrogenation of the at least partially hydrogenated LOHC in the chemical reactor while releasing hydrogen, and transferring the hydrogen by compression (4) into the infrastructure of the vehicles 5 transferring the low-energy LOHC into a second tank 2.

The invention will be described in more detail below with reference to the figures of the drawings using a plurality of embodiments.

Embodiment 1

A conventional filling station is nowadays supplied by a tanker truck, which delivers about 30 tons of fuel corresponding to 40,000 liters and fills the underground tank. If the average tank volume of a passenger car is 50 liters (range 600 km), 800 passenger cars can be filled with one delivery. If the consumption of a hydrogen passenger car is estimated at 1 kg hydrogen per 100 km (range also 600 km), the passenger car has to fill up with 6 kg hydrogen. A good estimate for the tank volume of a large lorry for compressed hydrogen is 400 kg hydrogen and therefore this supply lorry can only fill 67 cars, in other words only 8% of the quantity for passenger cars usual nowadays. Therefore, it is necessary for large lorries with compressed hydrogen to drive to the filling station frequently.

The useful quantity in 1 kg, perhydro-Dibenzyltoluene is 62 g hydrogen. In order to fill a hydrogen passenger car (range 600 km), 6,000/62=97 kg of this LOHC are required. A supply vehicle, which delivers 30,000 kg of LOHC, can consequently serve 309 customer passenger vehicles, 4.6 times more than in the case of pure hydrogen.

Embodiment 2

This example demonstrates the fact according to the invention where a 4 MW wind farm is close to the filling station. If one assumes 3,000 full-load hours, this wind farm will produce 12,000 MWh of electricity. This can be used, with 70% total efficiency, for water electrolysis, for reaction with a low-energy LOHC and to release the energy-rich form. 12,000*0.7=8,400 MWh=30,240,000 MJ hydrogen would thus be available. With a lower calorific value of 120 MJ/kg, this is 252 t hydrogen per annum. This wind farm would therefore be able to fill 42,000 passenger cars per year (consumption as in Embodiment 1) or 115 passenger cars/day.

From this example, it can be seen that a large wind farm can make the external supply of a hydrogen filling station unnecessary.

Embodiment 3

This example demonstrates the supply of hydrogen to fuel-cell powered forklifts in an industrial production environment. Forklifts are operating in a plant with an average consumption of 0.25 kg per hour. Thus, one trailer truck of hydrogen (with 400 kg hydrogen) has to be delivered to the production site every 1.600 operating hours. With 50 forklifts, nearly one hydrogen delivery per day would become necessary. Using an LOHC fuelling station as described the amount of hydrogen delivered by one truck (30.000 kg of perhydro-Dibenzyltoluene=1.860 kg hydrogen) would allow operation for 7.440 hours or 6 full days with 50 forklifts.

Alternatively the LOHC could be loaded on-site with hydrogen produced from electricity, e.g. from a wind turbine. The storage of hydrogen in LOHC enables decoupling of consumption and production.

What is claimed is:

1. A method for operating a hydrogen filling station for a vehicle, the method comprising:
   storing a LOHC in the filling station, wherein hydrogen is chemically bound to the LOHC such that the LOHC is at least partially hydrogenated;
   releasing the chemically bound hydrogen from the LOHC at pressures ofvacuum to ten bar;
   transferring the released hydrogen into a hydrogen infrastructure of the vehicle;
   condensing organic vapors by means of a condensator;
   cooling the hydrogen to a temperature that is suitable for filling into the vehicle;
   transferring the condensed vapors into a second tank; and
   transferring the energy-lean LOHC into the second tank.

2. A method according to claim 1, further comprising:
   transferring the at least partially hydrogenated LOHC from a first storage tank into at least one chemical reactor;
   dehydrogenating the at least partially hydrogenated LOHC in the chemical reactor while releasing hydrogen; and
   transferring the hydrogen by compression into the hydrogen infrastructure of the vehicle.

3. A method according to claim 1, wherein the LOHC is being dehydrogenated in the reactor at temperatures from 150° C. to 300° C.

4. A method according to claim 1, wherein the LOHC is being dehydrogenated in the reactor at pressures from vacuum to 5 bar.

5. A method according to claim 1, wherein the LOHC is being dehydrogenated in the reactor at pressures from 0.5 to 1.5 bar.

6. A method according to claim 1, wherein a chemical catalyst is usable for the process.

7. A method according to claim 1, wherein the vehicle is filled with the hydrogen at the filling station.

8. A method according to claim 1, wherein an energy-rich LOHC, which was produced at other sites by loading the energy-lean form of the LOHC, is dehydrogenated at the filling station.

9. A method according to claim 1, wherein one of Dibenzyltoluene, Benzyltoluene, isomeric mixtures of Dibenzyltoluene or Benzyltoluene, N-ethylcarbazole, N-n-propylcarbazole and N-iso-propylcarbazole is used as the LOHC in the energy-lean form.

10. An arrangement for operating a hydrogen filling station, the arrangement comprising:
    a first storage tank for an energy-rich form of LOHC, wherein the energy-rich form of the LOHC is at least partially hydrogenated;
    a second storage tank for energy-lean form of LOHC;
    at least one chemical reactor for at least partial dehydrogenation of the at least partially hydrogenated LOHC while releasing hydrogen at pressures of vacuum to ten bar;
    a compressor for compressing the released hydrogen from a pressure close to atmospheric pressure to an operating pressure of the hydrogen container of the vehicle; and
    a condensator condensing organic vapors to provide condensed vapors, the condensed vapors being delivered to the second storage tank, wherein the hydrogen is cooled to a temperature that is suitable for filling into the vehicle.

11. An arrangement according to claim 10, wherein the energy-rich LOHC is at least partially produced by regeneratively produced electricity, water electrolysis and hydrogenation at the site of the filling station.

12. An arrangement according to claim 10, further comprising a buffer element, which is arranged between the compressor and the vehicle.

13. An arrangement according to claim 12, wherein the buffer element is a pressurized hydrogen storage container.

14. An arrangement for operating a hydrogen filling station, the arrangement comprising:
    a first storage tank for an energy-rich form of LOHC, wherein the energy-rich form of the LOHC is at least partially hydrogenated;
    a second storage tank for energy-lean form of LOHC;
    at least one chemical reactor for at least partial dehydrogenation of the at least partially hydrogenated LOHC while releasing hydrogen at pressures of vacuum to ten bar;
    a compressor for compressing the released hydrogen from a pressure close to atmospheric pressure to an operating pressure of the hydrogen container of the vehicle; and
    a condensator condensing organic vapors to provide condensed vapors, the condensed vapors being transferred from the condensator to the second storage tank, wherein the hydrogen is cooled to a temperature that is suitable for filling into the vehicle.

15. A method for operating a hydrogen filling station for a vehicle, the method comprising:

storing a LOHC in the filling station, wherein hydrogen is chemically bound to the LOHC such that the LOHC is at least partially hydrogenated;
releasing the chemically bound hydrogen from the LOHC;
transferring the released hydrogen into a hydrogen infrastructure of the vehicle;
condensing organic vapors by means of a condensator;
cooling the hydrogen to a temperature that is suitable for filling into the vehicle;
transferring the condensed vapors into a second tank; and
transferring the energy-lean LOHC into the second tank.

\* \* \* \* \*